United States Patent
Lewis

(10) Patent No.: US 11,685,241 B2
(45) Date of Patent: *Jun. 27, 2023

(54) SOFT FRONT COCKPIT COVER WITH LINKAGE

(71) Applicant: Bestop, Inc., Louisville, CO (US)

(72) Inventor: Stephen J. Lewis, Harrison Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/749,832

(22) Filed: May 20, 2022

(65) Prior Publication Data
US 2022/0305891 A1    Sep. 29, 2022

Related U.S. Application Data

(63) Continuation of application No. 16/945,107, filed on Jul. 31, 2020, now Pat. No. 11,364,780.

(60) Provisional application No. 62/882,221, filed on Aug. 2, 2019.

(51) Int. Cl.
*B60J 7/12* (2006.01)

(52) U.S. Cl.
CPC .......... *B60J 7/1265* (2013.01); *B60J 7/1243* (2013.01); *B60J 7/1247* (2013.01)

(58) Field of Classification Search
CPC . B60J 7/1291; B60J 7/11; B60J 7/1265; B60J 7/1243; B60J 7/1247
USPC ................................... 296/218, 219
See application file for complete search history.

(56) References Cited

U.S. PATENT DOCUMENTS

| | | |
|---|---|---|
| 9,539,888 B2 | 1/2017 | Haberkamp et al. |
| 2016/0236556 A1 | 8/2016 | Smith et al. |
| 2016/0263975 A1 | 9/2016 | Bowles |
| 2021/0031603 A1 | 2/2021 | Lewis |

*Primary Examiner* — Joseph D. Pape
(74) *Attorney, Agent, or Firm* — Warn Partners, P.C.

(57) ABSTRACT

An articulating soft front cockpit cover assembly including an auxiliary tensioning link, coupling link and cross-car bow. A pivot point rotatable joining the auxiliary tensioning link and coupling link is located at the top of the auxiliary tensioning link. A bracket is provided on the auxiliary tensioning link or coupling link and extends cross-car and attaches to the front or rear edge of the cross-car bow. The soft front cockpit cover assembly in sealing engagement with a rearward top portion of a roof. The articulating portion movable between at least a closed position over about the front vehicle cockpit and at least one open position for an open-air feel.

19 Claims, 10 Drawing Sheets

SOFT FRONT COCKPIT COVER WITH LINKAGE

CROSS-REFERENCE TO RELATED APPLICATIONS

The instant application is a continuation of U.S. patent application Ser. No. 16/945,107, filed Jul. 31, 2020, which claims the benefit of U.S. Provisional Application No. 62/882,221, filed Aug. 2, 2019. The disclosures of the above applications are incorporated herein by reference.

FIELD OF THE INVENTION

The present invention relates to a roof top assembly including at least one soft panel top cover that seals against a rear top portion of the roof of a vehicle.

BACKGROUND OF THE INVENTION

Providing convertible tops for sport utility (SUV) type vehicles is desired. Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open-air feel without removing the entire top. If the entire hard top is removed, it then must be stored, which is often difficult because of the size of the top. Other convertible roofs use a hard top that is large and bulky and does not provide any open-air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily stowable top made of articulable material or arrangement to provide an efficient light weight top that can be effectively opened quickly to provide what is often referred to as an open air feel, where a portion of the top of the roof is moved from a closed or deployed position to at least one open or stowed position exposing a portion of the inside vehicle cockpit/passenger compartment to the outside without removing the top.

SUMMARY OF THE INVENTION

The present invention is directed to a foldable roof assembly having a soft front cockpit cover assembly that is in operable sealing engagement with a hard-top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft front cockpit cover assembly preferably includes two door rails operably connected to side sport bars of the vehicle (or other vehicle component(s)) and a rear header operably connected to the vehicle. The soft front cockpit cover assembly includes an articulating portion including a front side rail operably connected to first bow (or tensioning bow), a rear header and a coupling link, which coupling link is operably connected to a 2-bow and an auxiliary tensioning link. Preferably, at least one pivot point for the articulating portion is provided on each door rail, door rail bracket(s) or directly to the sport bar or other predetermined vehicle structure, most preferably, provided directly on the rear header. The articulating portion cycles between a closed position and at least one open position, preferably an open sunroof position. Most preferably, the rear header is a closeout for operable sealing engagement with a hard-top roof portion. The rear header is most preferably lightweight by using a lighter rear header, e.g., rear header closeout that is a wireframe and/or lightweight molded piece and/or plurality of lightweight molded section(s) operably connected together, or any suitable combination thereof, and by using minimal framing and using soft goods. The foregoing all further helps with ease of installation and ease of cycle efforts of the pivotal portion. Further, preferably, the assembly is mountable to the vehicle without any modification, drilling of holes, or any other change to existing hardware and structure to the vehicle other than the removal of the manufacturer existing front cockpit panel, e.g., hard panel(s).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
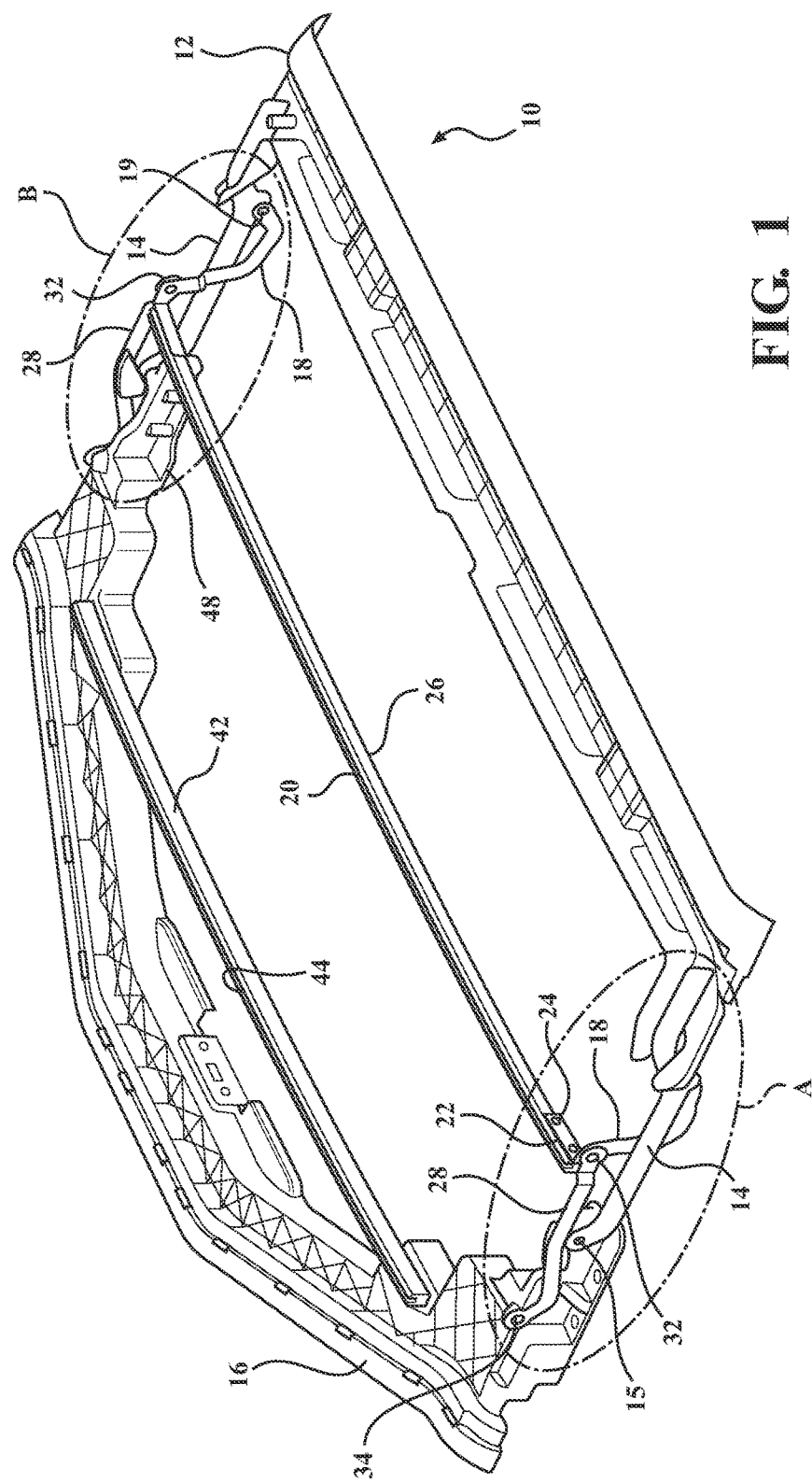
FIG. 1 is a perspective view of a soft panel top cover assembly with a pivot point at the top of an auxiliary tensioning link and a cross-car bow connected to a coupling link, in accordance with the present invention.
Figure 2:
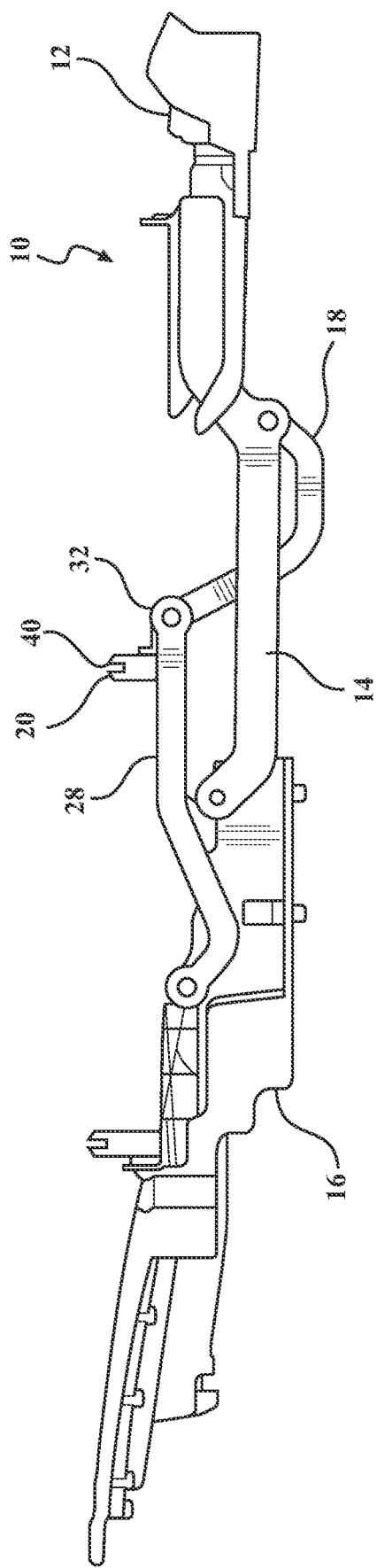
FIG. 2 is an enlarged side elevation view of FIG. 1.
Figure 3:
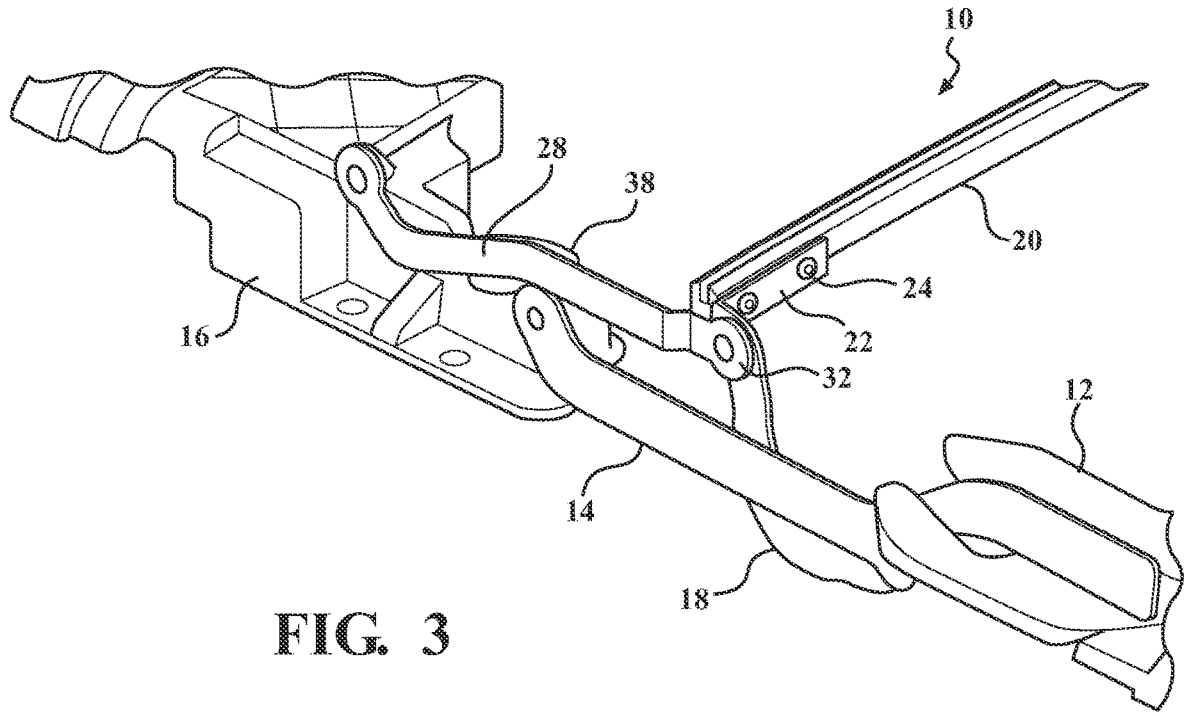
FIG. 3 is an enlarged perspective view taken from 'A' of FIG. 1.
Figure 4:
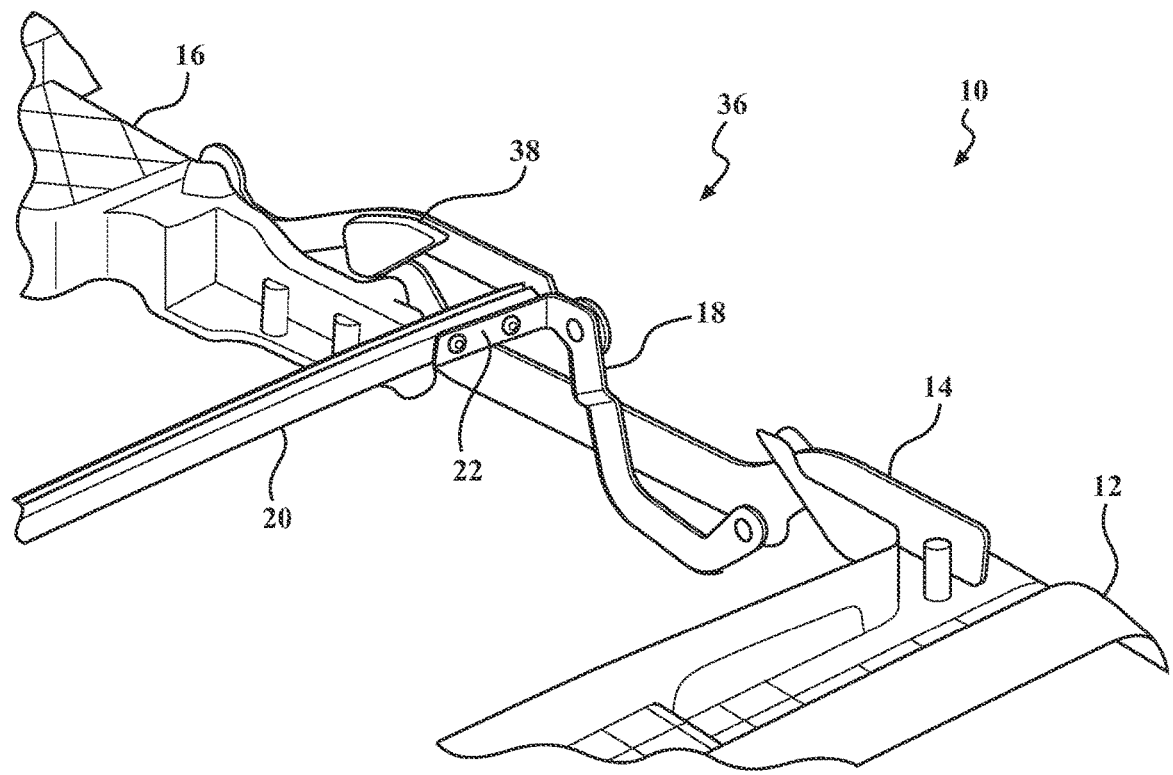
FIG. 4 is an enlarged perspective view taken from 'B' of FIG. 1.

The following description of the preferred embodiment(s) is merely exemplary in nature and is in no way intended to limit the invention, its application, or uses.

Referring to FIGS. 1-7, there is depicted a soft top cover assembly shown generally at 10 including a tensioning bow 12, e.g., front header, connected to a front side rail 14. A rear header 16 is connected to the vehicle and the front side rail 14 is preferably connected to the rear header 16. Most preferably, a pivot point 15 is provided on the rear header at the front side rail 14 attachment. Other suitable front side rail 14 attachment locations on alternative components are contemplated depending on the application without departure from the scope of the present invention. A coupling link 18 is connected to a cross-car bow 20, e.g., 2-bow, which bow 20 is operably connected to a cover 17 that is a roof top soft cover. The coupling link 18 is connected to the front side rail 14 at pivot point 19. A bracket 22 of the coupling link 18 is connected to the cross-car bow 20. Preferably, the bracket 22 is an integrally formed flange of the coupling link 18 extending generally cross-car and connected to the cross-car bow 20 by at least one fastener 24. Alternatively, the bracket 22 is a weld-on bracket (e.g., bracket). Most preferably, the bracket 22 is a generally transverse member of the coupling link 18 extending generally cross-car and is connected to the front side 26 of cross-car bow 20 by a plurality of fasteners 24. An auxiliary tensioning link 28 is connected to the coupling link 18 at a pivot point 32. The auxiliary tensioning link 28 is also connected to the rear header 16 at pivot point 34.

The pivot point 32 is advantageously located at the top of the auxiliary tensioning link 28. The cross-car bow 20 is connected to the coupling link 18 inboard to the pivot point 32/auxiliary tensioning link 28. The combination of pivot point 32 location at the top of the auxiliary tensioning link 28, and the bow 20 connected to the coupling link 18 interior to the auxiliary tensioning link 28 provides significant advantages, including, but not limited to, superior rotation of the pivotal portion, shown generally at 36.

FIGS. 1-5 depict a closed sunroof position or closed roof top position covering or closing off the front roof top opening, for a sport utility vehicle. Although an SUV is depicted, it is understood that the present invention is operably adaptable for any vehicle, including, but not limited to, any SUV type, pickup truck, UTV, ATV, etc. FIG. 6 depicts an exemplary open sunroof position. FIG. 7 depicts the pivotal portion during rotation between the open and closed positions. When the tensioning bow 12/front side rail 14 rotate rearward toward an open sunroof position, the coupling link 18, and the auxiliary tensioning link 28 connected to the coupling link 18 at pivot point 32, rotate rearward with the cross-car bow 20 to the open sunroof position.

At least one stop 38 is provided, preferably, at least one on each side of the assembly 10. Preferably, the stop 38 is provided on the auxiliary tensioning link 28. It is understood that any other suitable stop 38 location and type and combination of elements to provide a stop, e.g., set the height of at least one bow or pivotal portion, is contemplated depending on the application without departure from the scope of the present invention. It is understood that the stop 38 is adaptable to rest upon another suitable predetermined part of the assembly 10 without departure from the scope of the present invention. It is understood that any other stop suitably configured to set the height and contact at least one bow with rotation to the open position is contemplated without departure of the scope of the present invention. The stop 38 is generally a triangular-like shaped stop. Alternatively, the stop 38 is a smaller stand off with a diameter not larger than the width of the link to which it is attached (e.g. attached to or integrally formed on the auxiliary link 28).

It is understood that alternative pivot point 15, 19, 34 locations suitable for the pivoting of the articulating portion 36 depending on the application is/are contemplated without departure from the scope of the present invention.

Preferably, the cross-car bow 20 is a fabric management bow. Most preferably, the cross-car bow 20 is a fabric management bow operably coupled to the soft top cover 17 and operably configured and arranged to provide operable fabric management of the cover 17 between the closed position and the at least one open position (e.g., sunroof position). It is understood that more than one fabric management bow on articulating portion 36 (or any other predetermined location(s) of the assembly 10) can be provided depending on the application without departure from the scope of the present invention. Preferably, at least one channel 40 is provided to operably attach the cover 17 to the cross-car bow 20 (or any other predetermined location(s) of the assembly 10).

At least one additional bow 42 is operably connected to the rear header 16. Preferably, the least one additional bow 42 is a fabric management bow. Most preferably, the at least one additional bow 42 is a fabric management bow operably coupled to the soft top cover 17 and operably connected to a rear header 16, most preferably, fixedly connected to the rear header 16 such that the bow 42 has a fixed location. It is understood that more than one fabric management bow on the rear header (or any other predetermined location(s) of the assembly 10) can be provided depending on the application without departure from the scope of the present invention. Preferably, at least one channel 44 is provided to operably attach the cover 17 to the rear header 16 (or any other predetermined location(s) of the assembly 10). The at least one additional bow 42 is preferably fastened to the rear header, e.g. at least one screw, bolt, bracket etc). The fabric management bows manage the top cover as the assembly folds to the open position. The fabric management bows also minimize fabric movement in the closed position, which alleviates wind flap noise, in addition to managing the cover 17 during articulation and in the open position.

The rear header 16 operably seals with the rear top cover 46, e.g., hard top cover. The rear header 16 is preferably a lightweight injection molded material that is at least one piece, more preferably, a plurality of operably connected pieces, most preferably, at least three molded pieces operably connected together, e.g., fasteners, and/or bonded, and/or adhesive, and/or snap fit, and/or snap hook fit, and/or brackets, and/or mechanical fit, and/or mechanical fasteners and any combinations thereof. The rear header 16 preferably has at least two feet that rest on top of a cross vehicle member structure and helps set the height of the rear header 16 relative thereto. The rear header 16 includes at least one mounting surface 48 that operably connects to the vehicle, e.g., fasteners, mushroom fasteners/knobs, etc, connecting each mounting portion to a respective sport bar (vehicle roll bar). Alternatively, both sides of the rear header 16 only connects to respective door rails 50, which door rails 50 are connected to the vehicle (e.g., sport bars). Alternatively, there are no door rails.

Figure 5:
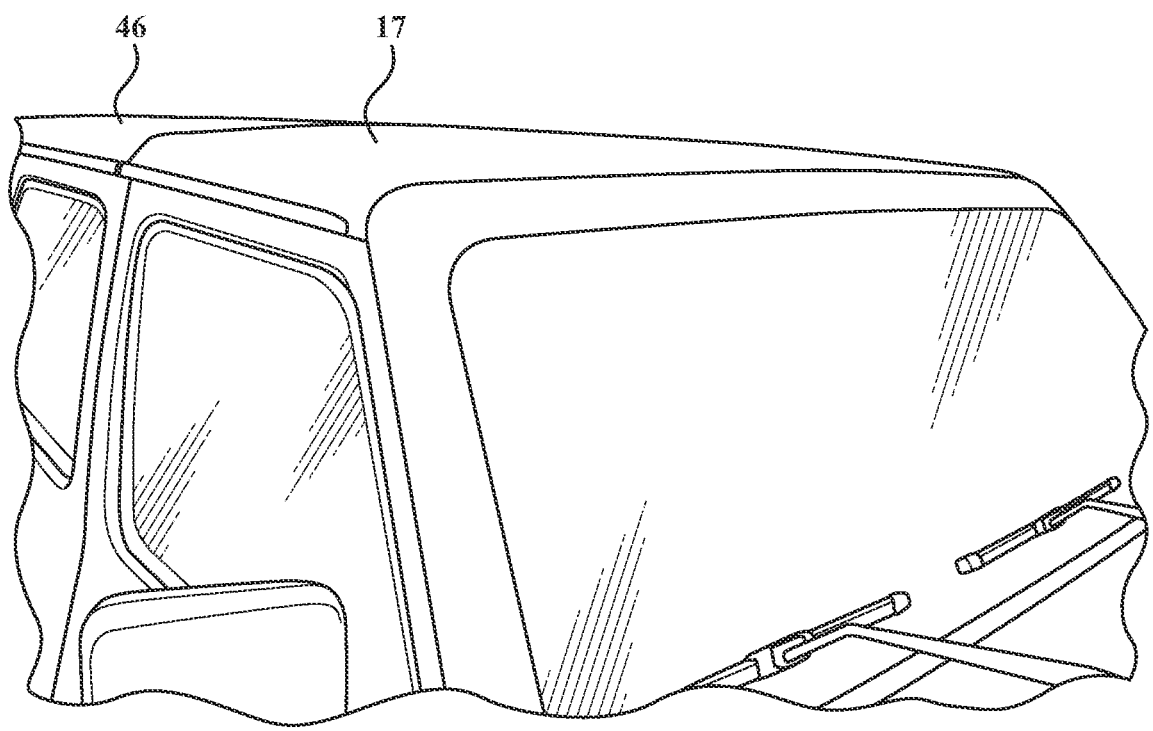
FIG. 5 is a perspective view of an exemplary vehicle with the soft panel top cover assembly in a closed position.
Figure 6:
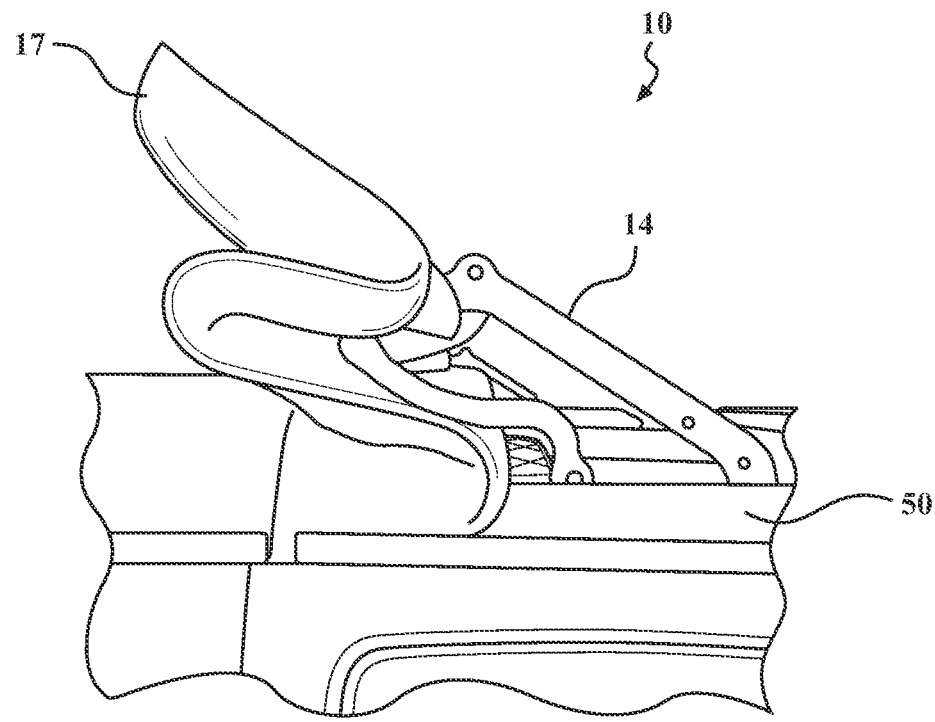
FIG. 6 is a side elevation view of the vehicle and assembly of FIG. 5 with the soft panel top cover assembly in an exemplary open position.
Figure 7:
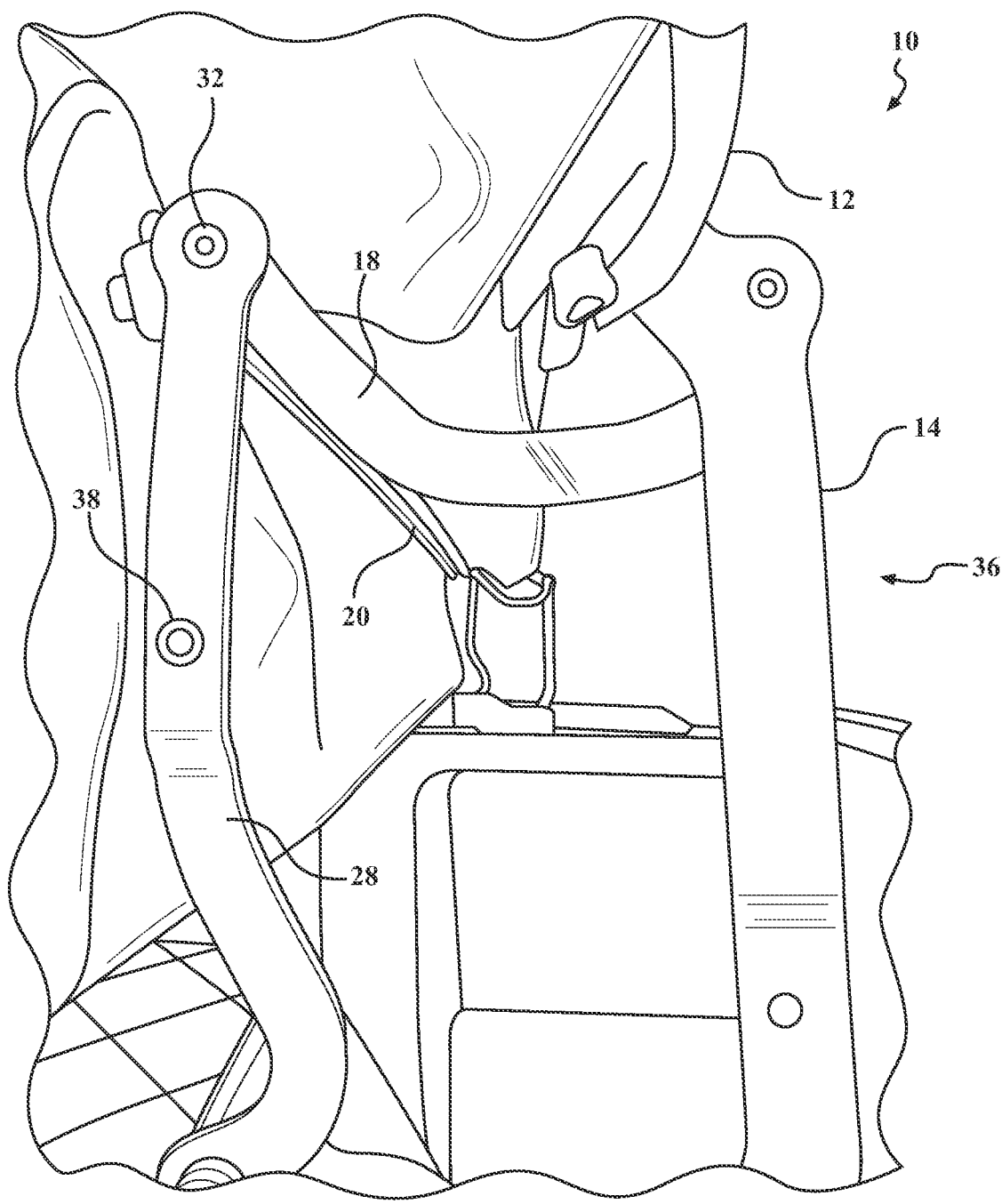
FIG. 7 is a side elevation view of the vehicle and assembly with the soft panel top cover assembly in a partially open position during cycling open/closed.

FIGS. 5-6 depicts a door rail 50 of the assembly 10 operably connecting to the vehicle, e.g., to the fore/aft sport bar on both sides of the vehicle, and/or for providing a mounting location for the rear header 16 and/or for operably providing a weather tight door seal or top cover seal, on each side and/or providing a drip rail, etc. Preferably, the door rail 50 is attached by at least one mounting surface, preferably, a first and second clamping surface attach to the vehicle (e.g., sport bar) using at least one fastener, e.g., fastener, threaded fastener, bolt, threaded mushroom knob fasteners etc. through at least one aperture through the at least one mounting surface Preferably, at least one mounting surface is provided on a rotatable member that rotates into engagement with the vehicle mounting surface. More preferably, the second clamping surface operable rotates up/down or side-to-side, most preferably, generally up/down to engage the underside of a vehicle part for mounting, e.g., under a sport bar, and preferably, the first mounting surface engages the upper side of the vehicle part for mounting, e.g., on top of the sport bar. The at least one mounting surface on each side of the header are preferably connected to the vehicle (e.g., sport bars). Alternatively, the top in accordance with aspects of the present invention includes no door rails.

According to aspects of the present invention, a second mounting surface is provided on each side of the header 16 to operably connect to the door rail 50. Preferably, at least one aperture is provided on the mounting surface operable for a fastener to mount the rear header 16 on the door rail 50 (e.g., screws, bolts, knobs, threaded fasteners, etc). Most preferably, a plurality of apertures and fasteners. Alternatively, the top in accordance with aspects of the present invention includes no door rails.

Referring to FIGS. 1-7 generally, in accordance with preferred aspects of the present invention, the cross bow 20 is positioned at the end of the coupling link 18. In accordance with preferred aspects of the present invention, the pivot joint 32 is at the top of the auxiliary link 28 (e.g., see FIG. 7). In accordance with preferred aspects of the present invention, the pivot joint 32 is at the forward most end of the auxiliary link 28 relative to when in the closed top position. In accordance with preferred aspects of the present invention, the coupling link 18 bracket 22 is located nearer to the rear header 16 than the pivot point 32 is located relative to the rear header when in the closed top position. In accordance with preferred aspects of the present invention, the cross bow 20 is located behind the pivot point 32 or nearer to the rear header 16 than the pivot point 32 is located relative to the rear header 16 when in the closed top position. In accordance with preferred aspects of the present invention, the cross bow 20 is not at the top of the auxiliary link 28. In accordance with preferred aspects of the present invention, the cross bow 20 is not directly attached to the auxiliary tensioning link 28. In accordance with preferred aspects of the present invention, the cross bow 20 is behind the coupling link 18 when in the closed top position. In accordance with preferred aspects of the present invention, the coupling link 18 is positioned partially below the front rail 14, when in the closed top position. In accordance with preferred aspects of the present invention, the generally the central portion of the coupling link 18 drops below the front rail 14, when moving into the closed top position. In accordance with preferred aspects of the present invention, the pivot point 32 is at the top of the auxiliary tensioning link 28 and the cross bow 20 is attached to the coupling link 18. In accordance with preferred aspects of the present invention, the pivot point 32 is not provided in any location that is not at the top of the auxiliary tensioning link 28 (e.g., FIG. 7), or forward end relative to when in the closed top position (e.g., FIGS. 1-2), and the cross bow 20 is not directly attached to any link that is not the coupling link 18, and the front of the cross bow 20 is directly attached to the coupling link 18.

Figure 8:
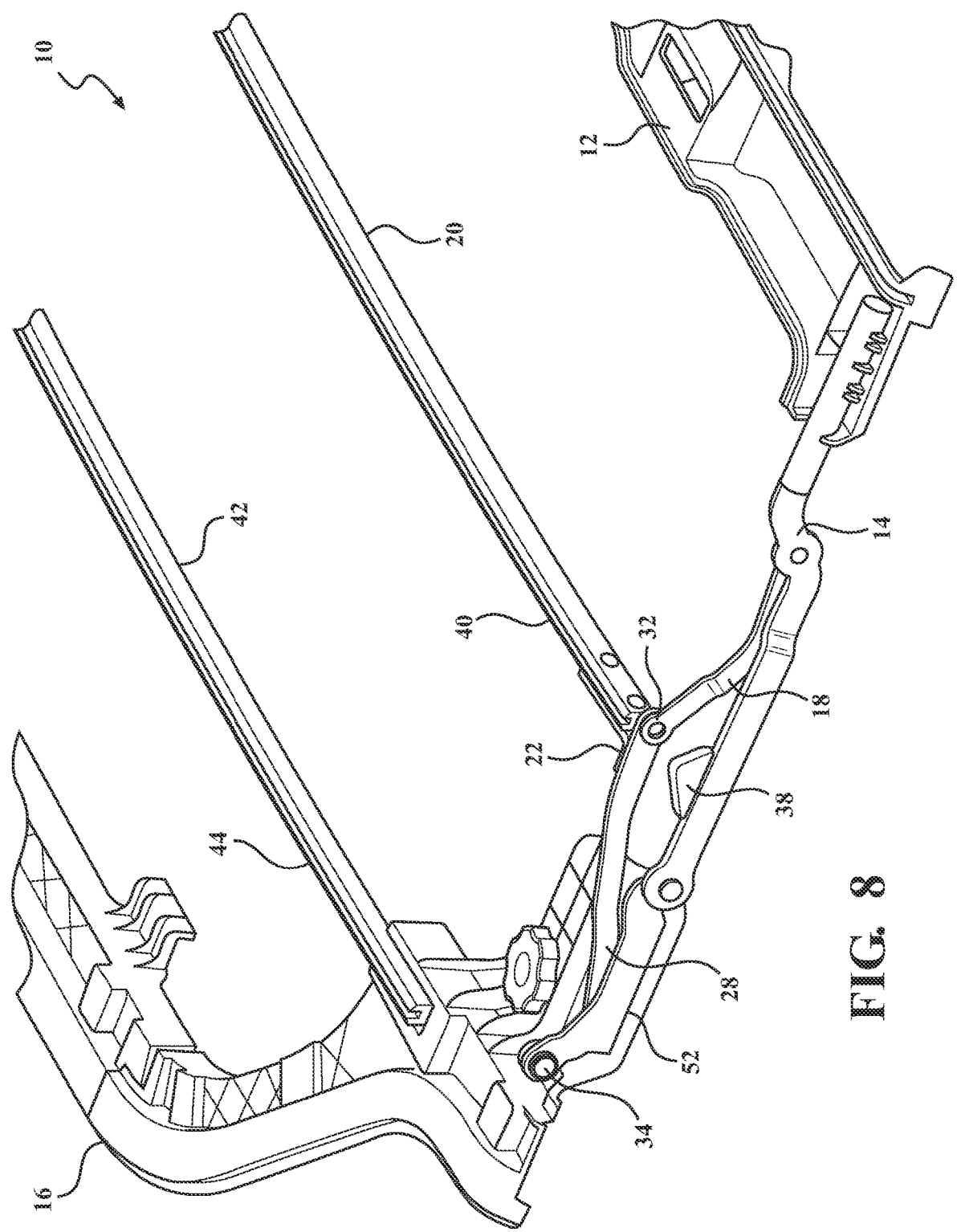
FIG. 8 is a perspective view of a soft panel top cover assembly with a pivot point at the top of an auxiliary tensioning link and a cross-car bow connected to an auxiliary tensioning link, in accordance with the present invention.
Figure 9:
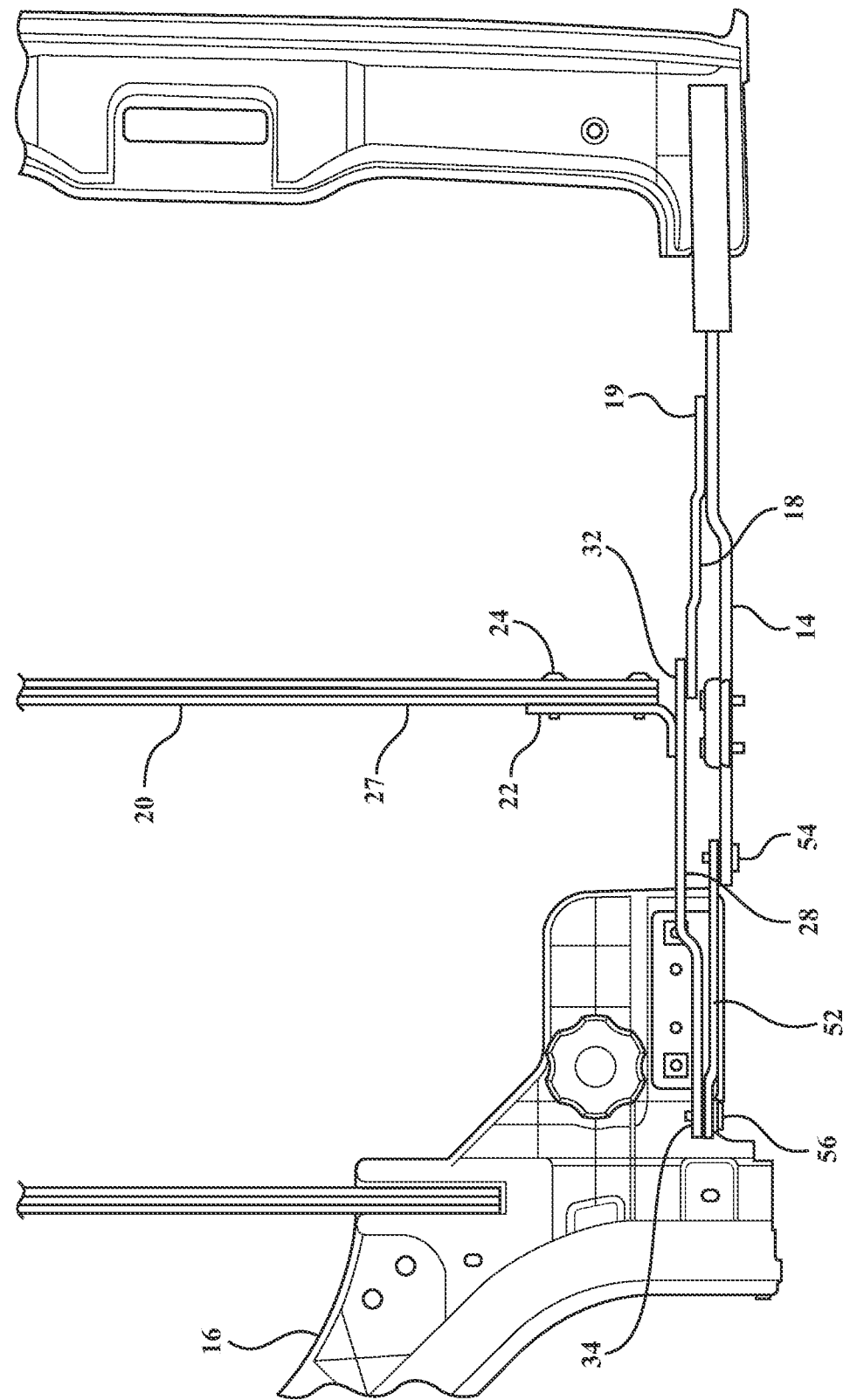
FIG. 9 is a top plan view of FIG. 8.
Figure 10:
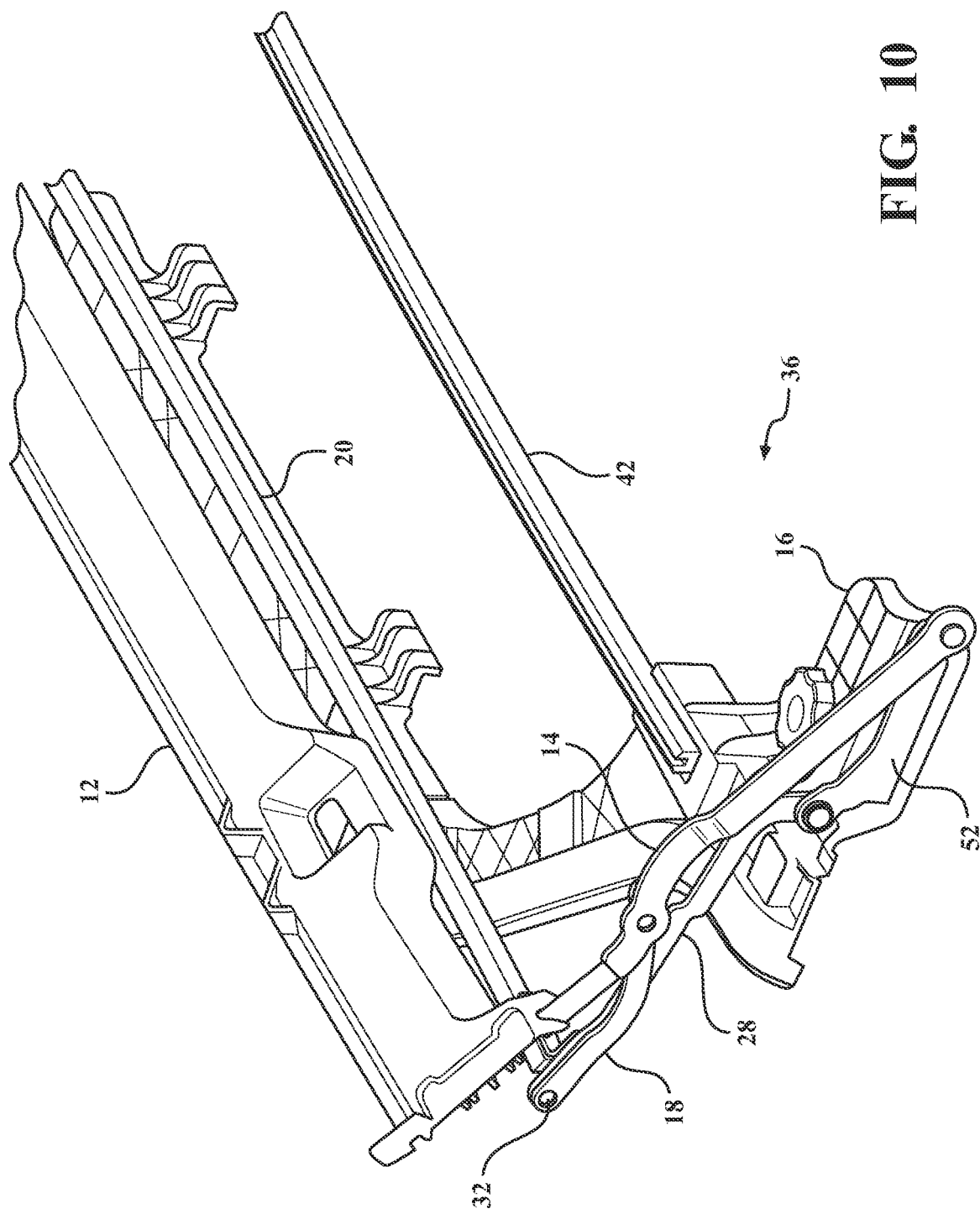
FIG. 10 is a perspective view of the assembly in an exemplary open position.

Referring now to FIGS. 8-10 generally, there is depicted the assembly 10 with similar features and like element numbers as described previously and depicted in the figures, including but not limited to FIG. 1, and will not be repeated here, but the description is incorporated in its entirety here—and wherein there are some alternative linkages/positions, as will now be described. The assembly 10 includes the tensioning bow 12, e.g., front header, connected to the front side rail 14. The rear header 16 is connected to the vehicle. The front side rail 14 is preferably connected to a second link 52 at pivot point 54. The second link is connected to the rear header 16 at another pivot point 56. Other suitable front side rail 14 attachment locations on alternative components are contemplated depending on the application without departure from the scope of the present invention. A coupling link 18 is connected to a cross-car bow 20, e.g., 2-bow, which bow 20 is operably connected to a cover 17 that is a roof top soft cover. The coupling link 18 is connected to the front side rail 14 at pivot point 19. An auxiliary tensioning link 28 is connected to the coupling link 18 at a pivot point 32. The auxiliary tensioning link 28 is also connected to the rear header 16 at pivot point 34, most preferably shared by the second link 52. A bracket 22 of the auxiliary tensioning link 28 is connected to the cross-car bow 20. Preferably, the bracket 22 is a weld-on bracket (e.g., bracket). Most preferably, the bracket 22 is a generally transverse member of the auxiliary tensioning link 28 extending generally cross-car and is connected to the rear side 27 of cross-car bow 20 by a plurality of fasteners 24. Alternatively, the bracket 22 is an integrally formed flange of the auxiliary tensioning link 28 extending generally cross-car and connected to the cross-car bow 20 by at least one fastener 24.

The pivot point 32 is advantageously located at the top of the auxiliary tensioning link 28. The cross-car bow 20 is connected to the bracket 22 of the auxiliary tensioning link 28 inboard to the pivot point 32/auxiliary tensioning link 28 body/link. The combination of pivot point 32 location at the top of the auxiliary tensioning link 28, and the bow 20 connected to the auxiliary tensioning link 28 bracket 22 provides significant advantages, including, but not limited to, superior rotation of the pivotal portion, shown generally at 36.

Referring now to FIGS. 1-10 generally, optionally, at least one attachment feature is provided. A first attachment portion operably coupled to or integrally formed with the rear header 16, most preferably, with the at least one mounting surface. The first attachment portion includes at least one mounting feature, preferably, at least one aperture, most preferably, at least two threaded apertures. A second attachment portion operably coupled to or integrally formed with the rear header 16, most preferably, adjacent the second mounting surface. The first attachment portion includes at least one mounting feature, preferably, at least one aperture, most preferably, at least two threaded apertures. Alternatively, the second attachment portion is operably coupled to or integrally formed with the door rail 50. At least one accessory or other predetermined attachment is operably connected to the first attachment portion and/or second attachment portion. By way of non-limiting example, at least one sunshade assessor, retractable sunshade, wind diffuser, mesh top, soft panel, side curtain shade, overhead shade, decorative shade, cross car member, sound bar, grab handle, lighting device, light bar, lock box, storage unit, tray, overhead barrier, vertical barrier, pet barrier, netting, roll bar or any other predetermined accessory and combinations thereof.

Each door rail 50 is connected to the rear header 16 (e.g., fastened, mechanical interface, bonded, adhesive, and combinations thereof), preferably, by at least one fastener, most preferably, by a plurality of fasteners, bonded, IR welded, mechanical fit, adhesive, etc and combinations thereof. Since the rear header 16 is most preferably a separately formed piece from the door rails 50,50, the rear header and door rails 50,50 do not need to ship through the entire supply chain as a larger unit. Selectively shipping disassembled for at least part of the supply chain allows for more efficient packaging footprint/arrangement and allows for a decreased shipping package size since a larger dimensioned packaging container is not required to accommodate a large rear header/door rails assembly. Selectively decreasing the shipping container size for the soft cover assembly of the present invention has a significant advantage and greatly decreases shipping costs, a significant advantage over conventional, bulky soft tops that necessitate larger shipping containers and drives increased shipping costs.

Alternatively, the door rails 50,50 are integrally formed with the rear header 16. Alternatively, according to aspects of the present invention, there are no door rails.

The rear header 16 is preferably one piece, most preferably, injection molded as a single piece. Alternatively, the rear header 16 is a plurality of pieces operably connected together, e.g., at least three pieces. If a plurality of pieces, they are operably connected together by e.g., brackets, fastened, mechanical interface, bonded, adhesive, by at least one fastener, by a plurality of fasteners bonded, IR welded, mechanical fit, adhesive, etc and combinations thereof. The rear header 16 is preferably a lightweight rear header. Most preferably, an injection molded lightweight material. Alternatively, the rear header is at least partially a wireframe. Generally, the rear header 16 is in operable sealing engagement with the vehicle. Typically, the rear header 16 is in operable sealing engagement with the hard top. Preferably, the rear header 16 is in operable sealing engagement with a hard-top seal.

Preferably, the door rail 50 has at least one seal, preferably, a plurality of seals. Optionally at least one seal, e.g., rubber bulb seal, is provided on at least one location of the door rail 50, e.g., within a channel or drip rail. Optionally, at least one seal is provided toward the end of the door rail 50 adjacent the rear header 16. Optionally, at least one seal is provided toward the forward end of the door rail 50 relative to the installed vehicle position. Optionally, at least one seal is provided toward the ends of the front header 12. Optionally, the rear header 16 includes at least one seal, e.g., rear seal, seal to hardtop, etc.

At least one latch mechanism is provided to selectively connect the tensioning bow 12 to the vehicle in the closed position, (e.g., latch to footman loop or each including a paddle or latch handle, latch and at least one spring.) The latch mechanism gives more reach than conventional latch handle devices, e.g., about 0.5 to 1.5 inches greater, preferably, at least about 1 inch greater). This makes latching to the vehicle easier. The paddle is rotatable. The latch is rotatable. The spring is additionally advantageous in that it reduces or eliminates rattling of the paddle because the paddle is biased to not freely move, whereas conventional latches moved around and rattled when not connected to the vehicle because there was nothing preventing that movement. The latch mechanism of the present invention accommodates the new predetermined vehicle interface. The interface is generally a locator for a factory finish hard top. When the assembly is folded to the closed position, the latch mechanisms can be secured to the vehicle, e.g., vehicle windshield header. In operation, each latch handle is pivoted, e.g., pivoted down, until the hook engages a respective footman loop or other vehicle structure. The latch is pivoted back up to complete the securement of the assembly to the vehicle header in the closed position.

Preferably, at least one cable is operably coupled to at least both sides of the cover 17. The cable is attached at one end to the door rail 50 and at the second end to the front header 12. The cable is preferably located in a pocket formed along the cover 17 edge, e.g., preferably sewn pocket. The second end of the cable can run at least partially cross car and operably couple to the rear header 16 by at least one spring for tensioning the top cover 17. Alternatively, the cable runs at least partially cross car and is operably coupled to the front header 12 by at least one spring for tensioning the top cover 17. Alternative attachments locations and cable locations are contemplated depending on the application without departure from the scope of the present invention.

Preferably, at least one trim is connected to the front header 12, e.g., by a plurality of fasteners received in a plurality of apertures, assisting in trapping the cover 17 material and trimming the leading edge of the first bow 12. A lip can be formed along the header 12 to operably retain the cover 17, preferably, wrapped around the front edge and sandwiched between opposing features of the header, e.g., using bracket(s), extrusion(s), molded part(s), adhesive, fasteners, etc. The cover 17 is operably connected to the rear header 16, preferably, wrapped around the rear edge and sandwiched between opposing features of the header 16, e.g., using bracket(s), extrusion(s), molded part(s), adhesive, fasteners, etc.

Preferably, at least one rear clamp mounting portion is provided. Preferably, the rear clamp mounting portion includes at least two apertures. At least one rear clamp is operably connected to the rear clamp mounting portion using a plurality of fasteners, e.g., bolts, screws, knobs, latches, etc. Preferably, the rear clamp includes at least one flange. Most preferably, the rear clamp includes at least one flange fitting under the cross-car member (e.g., at a substantially central cross car location to help secure the assembly to the cross-car member.

In accordance with an aspect of the present invention, a fastener arrangement (e.g., screw in bushing, rivet, threaded fastener, elbow bolt, threaded insert etc and combinations thereof) provides for all of the respective pivotal connections to allow the top to be cycled open/closed, as will be described in greater detail below. However, alternative pivot joint mechanisms can be used suitable for cycling the top open/closed depending on the application without departing from the scope of the present invention. Elimination of bushings and screw arrangements is contemplated without departure from the scope of the present invention. Incorporating at least one attachment bracket, e.g., including pivot points, is contemplated depending on the application without departure from the scope of the present invention. The pivot points are preferably integrated. More preferably, the pivot points are integrated molded in pivot points. It is contemplated that the pivot points are assembled.

Figure 11:
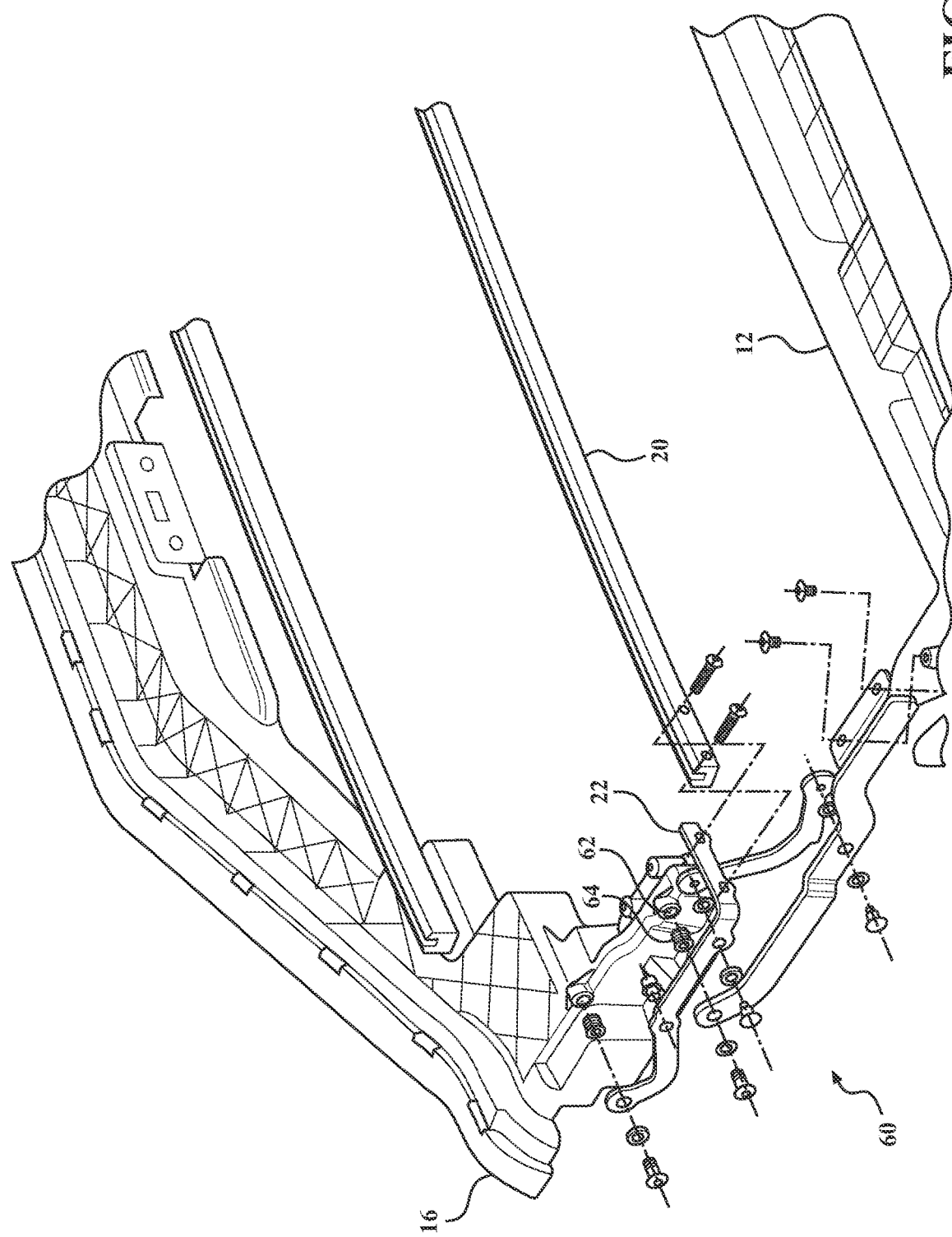
FIG. 11 is a perspective view of an exemplary connector arrangement, in accordance with the present invention.
Figure 12:
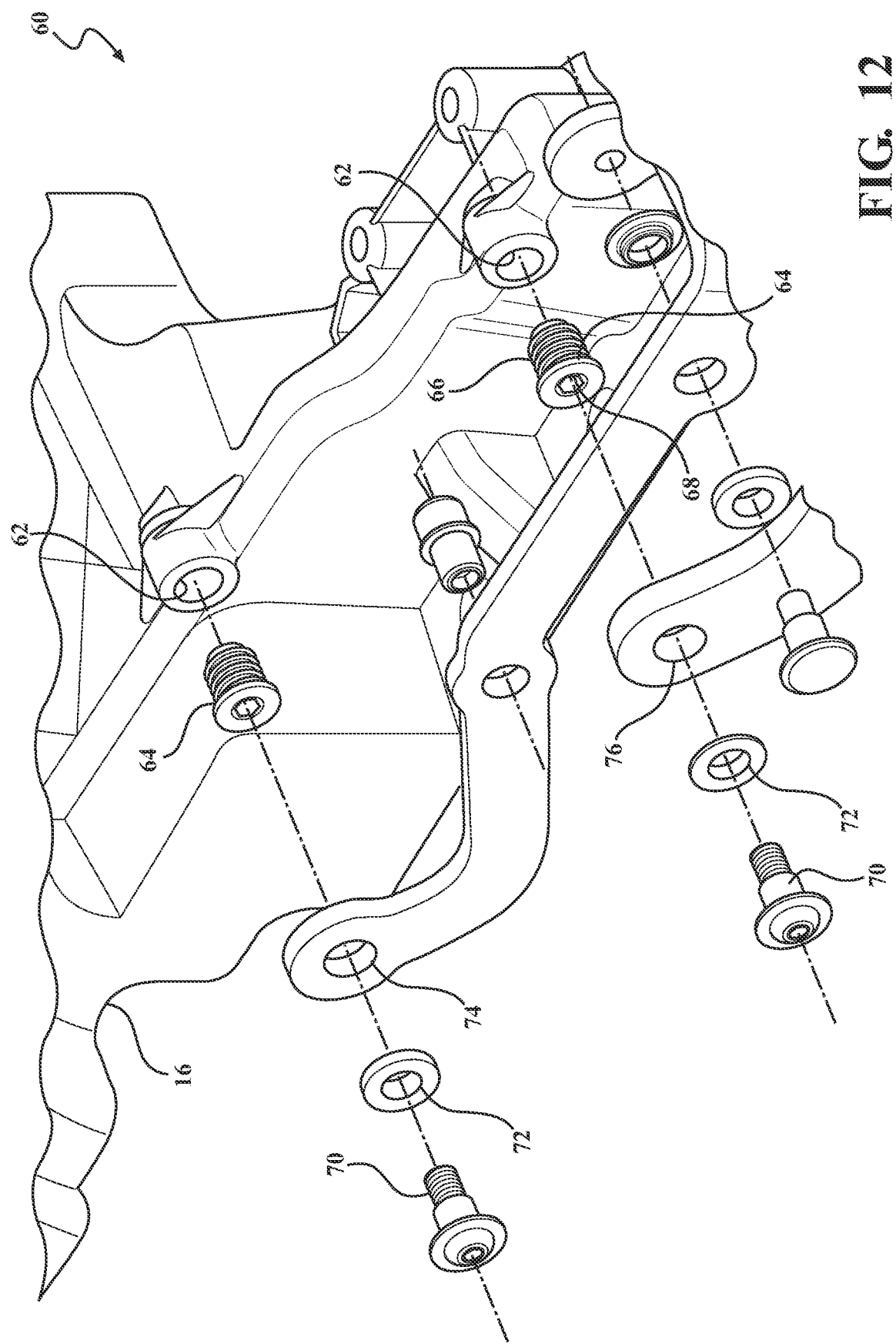
FIG. 12 is an exploded view of FIG. 11.

FIGS. 11-12 depict an exemplary connector arrangement, indicated generally at 60, e.g., a screw in bushing arrangement that provides for the pivots on the molded rear header 16 for bows/links. At least one molded pocket 62 is provided for receiving a respective threaded insert 64. The threaded insert 64 is applied into the molded pocket 62 of the plastic molding of the rear header 16. Preferably, the threaded insert 64 (or "connector") is threaded on the outside 66 for attachment to the rear header 16. The insert 64 is also threaded on the inside 68 for attachment of a fastener 70, preferably shoulder bolt, for forming the pivot with the bows/links, e.g., with the front side rail 14, and/or auxiliary tensioning link 28, and/or second link 52, at respective pivot points. At least one washer 72 is preferably used for the fastener 70 aligned with an aperture 74 and 76, respectively, through the bows or links, e.g., aperture through the front side rail 14, and/or auxiliary tensioning link 28, and/or second link 52, etc. Preferably, a plurality of molded pockets 62 and threaded inserts 64 are provided on at least the rear header 16.

Referring to FIGS. 1-12 generally, the left half of the assembly 10 and corresponding features are substantially mirror image/symmetrical to the right half of the assembly 10 and corresponding features depicted in the figures or described herein. The soft front cockpit cover assembly 10 is preferably a foldable and sealable with a hard-top roof portion of the vehicle. The soft panel top assembly 10 is connected to a vehicle. The vehicle includes a windshield frame with side members, e.g., sport bars, extending therefrom and a cross bar or cross member operably connecting the side members substantially adjacent the rear of the driver/passenger compartment, although the top is operably adaptable for any other location contemplated. The soft panel top assembly 10 folds back to give the occupant a quick and easy open-air effect, e.g., lightweight, and easily operated at a short interval stop, without completely removing the soft panel top assembly 10 from the vehicle. Folding the soft panel top assembly 10 between a closed position and at least one open position is also achievable without the occupant needing to leave the vehicle and eliminates removal and storage of roof panels from the vehicle. Once cycled to the open position, the soft panel top assembly 10 also does not require strapping the assembly down to maintain open air positioning. Further, the soft panel top assembly 10 includes built in stops to set the height of the pivotal portion 36. The assembly 10 geometry generally follows the hardtop contours. The assembly 10 is in sealing engagement against the hardtop's seal(s). When closed, assembly 10 also seals with the vehicle windshield frame seal(s). Preferably, a bushing and fastener arrangement is used for all of the respective pivot points and pivot joints. However, alternative suitable pivot mechanisms can be used without departing from the scope of the invention depending on the particular application. The tensioning bow 12 is adapted for releasable attachment to the windshield frame for opening and closing the assembly 10. The tensioning bow 12 has at least attachment mechanisms, e.g., latches, paddles/spring/hook mechanism, or any other suitable attachment mechanism, connected thereto that have a hand actuated clamping arrangement to selectively connect to the windshield frame. The tensioning bow 12 is preferably molded plastic, e.g., plastic with steel reinforcement and comprises two attachment mechanisms, which when in the closed position attach to opposing features of the vehicle, e.g., metal loops, footman loops, molded parts, stamped parts, or any other vehicle interface etc, generally located under the visors of the vehicle, and when cycling to the open position, travel with the first bow. The attachment mechanisms provide for securing closure of the top to the existing windshield frame and are readily released by an operator for opening of the assembly. Optionally, at least one limiting stop is used to set the height of the articulating portion or any link thereof in the open or closed positions. In accordance with an aspect of the present invention, the cover 17 is sewn and/or adhered or otherwise attached to portions that fit within the respective channels, e.g., an extrusion is stitched or sewn and/or adhered to the cover 17. Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application. The rear header 16 has a plurality of attachment features for coupling to the cross member, e.g., at least one rear clamp, at least one rear clamp mounting portion and/or at least two locating brackets connected to the rear header, e.g., bottom thereof, by at least two fasteners, which interface with the cross member and/or hardtop to keep the rear header from lifting off the cross member in the installed position. The at least two feet operably locate to the cross member or hardtop, e.g., including a lip to a leading edge. Preferably, the feet generally set the rear header height relative to the hardtop. For installation, preferably, no modification to the hardtop, no drilling of any holes in the vehicle, or changing of any existing remaining components is required. The manufactures front cockpit panels are removed and the soft panel top assembly 10 is installed. Preferably, if door rails are used, the door rails 50 can ship separate from the rear header 16, which allows that the door rails 50 do not need to be connected to the rear header 16 or are not integrally formed with the rear header 16—thus, allowing significant decreases in shipping container size and shipping costs. Alternatively, the soft panel top assembly 10 ships in the entire supply chain as a rear header connected to or integrally formed with door rails. The rear header 16 is a rear header closeout operable to engage at least one seal existing on the hard top portion and provides a weatherproof seal, e.g., under compression with a bulb seal, lip, mucket, gasket or any other suitable seal to prevent leaks between the hard top portion and assembly 10. The assembly 10 can also include at least one seal. It is within the scope of the invention to manufacture the rear header 16 as a wireframe (e.g., bent wire frame welded together), lightweight molded plastic, or other suitable lightweight material and configurations and/or combinations thereof suitable to withstand predetermined strength requirements and to sealingly engage with the hard top portion, depending on the particular application without departing from the scope of the invention. The rear header 16 is a single piece or plurality of pieces. Preferably, the rear header 16 has at least three lightweight molded pieces operably connected together. More preferably, the rear header 16 is a single piece. Most preferably, the rear header 16 is a single piece and the door rails 50 are connected thereto, e.g., at some point in the supply chain or by the consumer. The assembly 10 is an after-market assembly and/or an original equipment manufacturer component. By way of non-limiting example, the manufactured door rails 50 ship unassembled to the rear header 16 to reduce shipping costs. At a final assembly facility, the door rails 50 are connected to the rear header 16 and delivered to the OEM, e.g., supporting just-in-time line requirements. This significantly reduces unit costs because the packaging shipping size is smaller to realize lower shipping rates. Alternatively, door rails are not required. Preferably, a plastic retainer slides over a metal backing piece connected by a fastener to keep the cover 17 connected on the rear header 16, e.g., the cover is sandwiched, and/or secured with a plurality fasteners. Similarly, preferably, the tensioning bow 12 has a similar metal backing and plastic retainer connecting the cover 17 to the header, e.g., the cover is sandwiched. The cover 17 is preferably secured to the rear header 16 and/or tensioning bow 12 without snaps. The assembly can also include a plurality of seals, e.g., at least one header seal, at least one door rail seal, at least one rearward door rail seal, at least one drip rail seal, or any other seal location when door rails are not used. The drip rail can include at least one aperture for draining water. Optionally, a seal, e.g., lip seal, bulb seal, edge seal, edge gimp, or any suitable seal, is operably connected to the cover 17 coupled to at least the rear edge surface of the rear header 16. By way of example, the lip seal is sewn and/or bonded to the cover 17 and sandwiched between the cover 17 and rear header 16 at the rear of the assembly 10. By way of non-limiting example, the seals are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals are preferably foam seals, most preferably soft sponge EPDM closed cell foam. Alternatively, at least one of the pairs of seals are a rubber mucket which is more robust. It is understood that the present invention is suitable for two door and four door vehicles. A headliner material or other dampening material(s) for reducing noise in the cockpit or improved climate control is contemplated without departure from the scope of the present invention. The headliner/dampening material is operably connected on the cockpit side of the cover, e.g., sewn. Alternatively, the headliner/dampening material is inserted into at least one pocket or sandwiched between layers of cover material. The 2-door and 4-door descriptions and drawings described herein are not limiting. It is understood that any embodiment, and combinations thereof, described herein can be modified and is/are utilizable on any convertible, 2-door, or 4-door vehicle. The present invention is directed to a stowable soft top assembly and operably adoptable for any vehicles and vehicle types, e.g., sliding and/or folding soft top assembly for 4-door and 2-door SUVs, all-terrain vehicles, utility task vehicles, off road vehicles, pickup trucks, Jeeps™ pickups, open air pickup trucks, any motor vehicles, etc. The left half of the soft panel top cover assembly 110 and corresponding features are substantially mirror image/symmetrical to the right half of the 10 and corresponding features depicted in the figures. The pivot points are integrated. Preferably, the pivot points are integrated molded in pivot points. It is contemplated that, alternatively, the pivot points are assembled. Providing at least one fabric management bow, e.g., fixed and/or articulating bow(s), is contemplated without departure from the present invention. The cover 17 is a predetermined material, e.g., soft material, fabric, twill acrylic fabric or sailcloth fabric.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A soft front cockpit cover assembly, comprising:
   an articulating portion operably coupled to a rear header, said rear header adapted for sealing engagement with a rear roof top portion, said articulating portion having an auxiliary tensioning link with a pivot point to a coupling link, wherein the pivot point is operably positioned to provide the connecting point of the auxiliary tensioning link and coupling link at the end of the auxiliary tensioning link;
   a cross-car bow operably connected to a cover;
   a bracket connected to said cross-car bow, said bracket integrally formed with or operably connected to said coupling link or said auxiliary tensioning link;
   wherein selectively rotating the articulating portion allows the cover to move between at least a closed position and at least one open position.

2. The soft front cockpit cover assembly of claim 1, wherein said bracket is provided on said coupling link and extends cross car to attach to said cross-car bow.

3. The soft front cockpit cover assembly of claim 1, wherein said bracket is integrally formed with or operably connected to said coupling link and said bracket is coupled to a front surface of the cross-car bow.

4. The soft front cockpit cover assembly of claim 1, wherein said bracket is provided on said auxiliary tensioning link and extends cross car to attach to said cross-car bow.

5. The soft front cockpit cover assembly of claim 1, wherein said bracket is integrally formed with or operably connected to said auxiliary tensioning link and said bracket is coupled to a rear surface of the cross-car bow.

6. The soft front cockpit cover assembly of claim 1, wherein said bracket is an L-bracket attached to said auxiliary tensioning link and the cross-car bow.

7. The soft front cockpit cover assembly of claim 1, wherein the coupling link is connected to a first side rail at another pivot point, wherein the first side rail is connected to a tensioning bow adapted to selectively connect to a windshield frame portion of the vehicle.

8. The soft front cockpit cover assembly of claim 7, wherein the first side rail is pivotally connected to the rear header at another pivot point.

9. The soft front cockpit cover assembly of claim 1, wherein the auxiliary tensioning link is pivotally connected to the rear header at another pivot point.

10. The soft front cockpit cover assembly of claim 1, wherein the pivot point located at the top end of the auxiliary tensioning link during rotation of the articulating portion in combination with the bracket attached to the cross-car bow inboard from the pivot point allows articulation of the articulating portion without binding.

11. The soft front cockpit cover assembly of claim 1, further comprising a second link fixedly connected to the rear header, wherein a first side rail is pivotally connected to the second link.

12. The soft front cockpit cover assembly of claim 11, wherein the first side rail is connected to a tensioning bow adapted to selectively connect to a windshield frame portion of the vehicle, and wherein the first side rail is connected to the coupling link at another pivot point.

13. A soft front cockpit cover assembly with linkages, comprising:
an articulating portion operably connected to a rear header, said rear header adapted for sealing engagement with a rear roof top portion, said articulating portion having an auxiliary tensioning link with a pivot point to a coupling link located at a top of said auxiliary tensioning link;
a cross-car bow operably connected to a cover;
a bracket connected to said cross-car bow, said bracket integrally formed with or operably connected to said coupling link or said auxiliary tensioning link;
wherein rotating the articulating portion in fore/aft directions allows the cover to move between at least a closed position and at least one open position; and
at least one connector arrangement including a molded pocket that receives a threaded insert to provide linkage attachment to said rear header.

14. The soft front cockpit cover assembly of claim 1, further comprising a plurality of threaded pockets formed in the rear header operable to receive a plurality of threaded inserts for attaching the auxiliary tensioning link.

15. The soft top cockpit cover assembly of claim 1, further comprising at least one stop setting the height of the auxiliary tensioning link.

16. The soft front cockpit cover assembly of claim 1, wherein the rear roof top portion is a hard top.

17. A soft front cockpit cover assembly adapted to operably connect to a sport utility vehicle, comprising:
an articulating portion operably coupled to a rear header and adapted to selectively rotate a cover to an open position and to a closed position adapted to close off a roof top opening of the sport utility vehicle;
a first side rail connected to a front tensioning bow adapted to selectively connect to a windshield frame of the sport utility vehicle;
a cross-car bow located inboard from an auxiliary tensioning link; and
a coupling link pivotally connected to the first side rail, said coupling link pivotally connected to a forward end of the auxiliary tensioning link at a pivot point, wherein the pivot point is at the top of the auxiliary tensioning link during rotation of the articulating portion between the closed position and an open top position.

18. The soft front cockpit cover assembly of claim 17, further comprising a plurality of threaded pockets formed in the rear header operable to receive a plurality of threaded inserts for attaching the auxiliary tensioning link and first side rail each with a respective threaded fastener aligned with apertures formed in the respective auxiliary tensioning link and first side rail.

19. A soft front cockpit cover assembly adapted for a vehicle, comprising:
a pivotal portion adapted to couple to the vehicle at a roof top opening of the vehicle, the pivotal portion including a soft cover, a rear header adapted to connect to the vehicle and adapted to allow a weather tight seal to a hard top roof portion, and the pivotal portion adapted to close off the roof top opening of the vehicle when in a closed position;
a first side rail connected to a front tensioning bow adapted to selectively connect to a windshield frame of said vehicle;
a coupling link pivotally connected to the first side rail, said coupling link pivotally connected to a forward end of an auxiliary tensioning link at a pivot point, wherein the pivot point is at the top of the auxiliary tensioning link during rotation of the pivotal portion between the closed position and the open position;
a second bow connected to the coupling link or auxiliary tensioning link at a location behind the pivot point relative to when the top is in the closed position and inboard to the auxiliary tensioning link plane;
wherein rotating the pivotal portion moves the soft cover between at least the closed position and at least the open position; and
wherein the pivot point located at the top end of the auxiliary tensioning link during rotation of the pivotal portion in combination with the second bow allows articulation of the pivotal portion without binding.

\* \* \* \* \*